(12) United States Patent
Wautier et al.

(10) Patent No.: US 8,211,977 B2
(45) Date of Patent: Jul. 3, 2012

(54) POLYMERIC COMPOSITIONS WITH ADHESIVE PROPERTIES

(75) Inventors: Henri Wautier, Braine-le-Comte (BE); Fernand Gauthy, Wemmel (BE)

(73) Assignee: Solvay (Societe Anonyme), Brussels (BE)

( * ) Notice: Subject to any disclaimer, the term of this patent is extended or adjusted under 35 U.S.C. 154(b) by 416 days.

(21) Appl. No.: 12/304,809

(22) PCT Filed: Jun. 26, 2007

(86) PCT No.: PCT/EP2007/056343
§ 371 (c)(1),
(2), (4) Date: Dec. 15, 2008

(87) PCT Pub. No.: WO2008/000730
PCT Pub. Date: Jan. 3, 2008

(65) Prior Publication Data
US 2009/0176047 A1    Jul. 9, 2009

(30) Foreign Application Priority Data

Jun. 26, 2006   (FR) .................................... 06 05715
Jun. 27, 2006   (FR) .................................... 06 05801
Nov. 10, 2006   (FR) .................................... 06 09870

(51) Int. Cl.
*C08L 51/00* (2006.01)
*C08L 51/06* (2006.01)
*C08L 67/00* (2006.01)

(52) U.S. Cl. ................. 525/71; 525/63; 525/69; 525/78; 525/79; 428/411.1; 428/421

(58) Field of Classification Search .................... 525/50, 525/55, 63, 64, 66, 67, 69, 70, 71, 78, 79, 525/72; 428/411.1, 421
See application file for complete search history.

(56) References Cited

U.S. PATENT DOCUMENTS

| | | | |
|---|---|---|---|
| 5,736,610 | A | 4/1998 | Nishi et al. |
| 5,880,204 | A | 3/1999 | McCarthy et al. |
| 5,882,753 | A | 3/1999 | Pedginski et al. |
| 5,965,275 | A | 10/1999 | Nishi et al. |
| 6,093,772 | A | 7/2000 | Bussi |
| 6,124,403 | A | 9/2000 | Crompton, Jr. |
| 6,225,404 | B1 | 5/2001 | Sorensen et al. |
| 6,277,914 | B1 | 8/2001 | Oreins et al. |
| 6,476,125 | B1 | 11/2002 | Iura et al. |
| 6,613,408 | B1 * | 9/2003 | Short ........................... 428/36.6 |
| 6,683,128 | B2 | 1/2004 | Turri et al. |
| 6,982,106 | B2 | 1/2006 | Bodart et al. |
| 2004/0242778 | A1 | 12/2004 | Etherton |
| 2004/0260022 | A1 | 12/2004 | Amos et al. |
| 2005/0048239 | A1 | 3/2005 | Mestemacher |
| 2005/0197460 | A1 | 9/2005 | Patel et al. |
| 2007/0232170 | A1 * | 10/2007 | Atwood et al. ............... 442/200 |

FOREIGN PATENT DOCUMENTS

| | | |
|---|---|---|
| EP | 206689 A2 | 12/1986 |
| EP | 0650987 A1 | 5/1995 |
| EP | 0812864 A2 | 12/1997 |
| EP | 976804 A1 | 2/2000 |
| EP | 1057849 A2 | 12/2000 |
| FR | 2818580 A1 | 6/2002 |
| FR | 2876698 A1 | 4/2006 |
| FR | 2876766 B1 | 4/2006 |
| FR | 2876767 A1 | 4/2006 |
| FR | 2876768 B1 | 4/2006 |
| GB | 2072203 A | 9/1981 |
| GB | 2309701 A | 8/1997 |
| JP | 62057448 A | 3/1987 |
| WO | WO9302138 A1 | 2/1993 |
| WO | WO2006045637 A1 | 5/2006 |
| WO | WO2006056581 A1 | 6/2006 |

OTHER PUBLICATIONS

Valenza A. et al., "Radiation Grafting Functionalization of Poly (Vinylidene Fluoride) to Compatibilize Its Blends With Polyolefin Ionomers", Polymer Engineering and Science, 1998, vol. 38, N. 3, p. 452-460 (9 p.).
PCT International Search Report dated Feb. 26, 2008 for International Application No. PCT/EP2007/056343 (5 p.).
Search Report from Institut National De La Propriete Industrielle dated Mar. 19, 2007 for priority French Application No. 06.09870 published in FR2902794 (3 p.).
Search Report from Institut National De La Propriete Industrielle dated Mar. 20, 2007 for priority French Application No. 06.05715 published in FR2902795 (3 p.).
Henri Wautier et al, U.S. Appl. No. 12/304,807, filed Dec. 15, 2008, entitled "Polymer Compositions Having Adhesive Properties".

* cited by examiner

*Primary Examiner* — Irina S Zemel
*Assistant Examiner* — Jeffrey Lenihan
(74) *Attorney, Agent, or Firm* — Arent Fox LLP

(57) ABSTRACT

Polymer compositions with adhesive properties comprising:
(1) at least one fluoropolymer (A) grafted by at least one compound (a), wherein the compound (a) contains at least one functional group (f1) capable of conferring adhesion properties on the fluoropolymer;
(2) at least one olefin polymer (B) grafted by at least one compound (b), wherein the compound (b) contains at least one functional group (f2) capable of conferring adhesion properties on the olefin polymer and of reacting with the functional group (f1) contained in the compound (a); and
(3) at least one polymer (C) chosen from polyesters and polyamides.

17 Claims, No Drawings

POLYMERIC COMPOSITIONS WITH ADHESIVE PROPERTIES

CROSS-REFERENCE TO RELATED APPLICATIONS

The present application is a U.S. national stage application under 35 U.S.C. §371 of International Application No. PCT/EP2007/056343 filed Jun. 26, 2007, which claims priority benefit to French patent application FR 06.05715 filed on Jun. 26, 2006, to French patent application FR 06.05801 filed on Jun. 27, 2006, and to French patent application FR 06.09870 filed on Nov. 10, 2006, all of these applications being herein incorporated by reference in their entirety for all purposes.

The present invention relates to polymer compositions with adhesive properties. It also relates to certain particular components of these compositions. It additionally relates to a method for preparing these compositions. The invention also relates to multilayer structures for which one of the layers is composed of the polymer composition with adhesive properties.

It is known that polyolefins, especially polymers of ethylene and propylene, are used for manufacturing pipes, tanks, containers and receptacles for the transport and storage of liquid hydrocarbons, in particular oils and fuels. The chemical resistance and the impermeability of these polymers with respect to these hydrocarbons are not however always sufficient for all the usages for which they are intended. To overcome this drawback, a barrier layer of another polymer is interposed between the hydrocarbon to be transported or stored and the polyolefin. Polymers that are both chemically resistant and impermeable frequently used for this purpose are fluoropolymers, in particular polymers and copolymers of vinyl and vinylidene fluorides.

These fluoropolymers have in turn another drawback: they do not adhere well to polyolefins. Hence, compositions have been developed with a view to improving the adhesion properties of the fluoropolymers.

Thus, document EP-A-0650987, the content of which is incorporated by reference in the present description, describes polymers with adhesive properties, the main fluorine-containing hydrocarbon-based chains of which are grafted by compounds comprising reactive or polar functional groups that have adhesive properties. These functional groups may be carboxyl groups, carboxylic anhydride residues, epoxy groups, hydroxyl groups, isocyanate groups, ester groups, amide groups, amino groups and hydrolysable groups containing a silyl or cyano radical. These polymers do not however adhere well enough to polyolefins.

Document EP-B-206689 concerns a laminate comprising at least two different layers of adhesive that are in contact composed of a fluorohydrocarbon polymer modified by a carboxyl, acid anhydride, hydroxyl or epoxide group and an α-olefin polymer modified by a carboxyl, acid anhydride, hydroxyl or epoxide group different from the preceding one. These two different layers of adhesive may be placed on a substrate layer prepared from a material chosen from various polymers including polyvinylidene fluoride, polyethylene and nylon. Thus, a four-layer laminate is mentioned that comprises a layer of polyvinylidene fluoride bonded to a layer of polyethylene by means of two different layers of adhesive. This multilayer structure has, in particular, the drawback of being composed of two layers of adhesive and therefore four layers in total, which poses technical problems during coextrusion on an industrial scale, it being technically easier to envisage if it is limited to three layers, therefore with a single layer of adhesive.

The problem therefore lies in the provision of an adhesive that can be satisfactorily bonded to a fluorohydrocarbon thermoplastic polymer layer on one side and to a non-compatible thermoplastic polymer layer on the other side, with a view to forming structures having multiple polymer layers that only contain a single layer of adhesive.

The present invention aims to provide a composition that makes it possible to strongly adhere, in the form of a single adhesive layer, a fluorohydrocarbon thermoplastic polymer and a non-compatible thermoplastic polymer.

The present invention therefore mainly relates to polymer compositions with adhesive properties comprising:
(1) at least one fluoropolymer (A) grafted by at least one compound (a), which compound (a) contains at least one functional group (f1) capable of conferring adhesion properties on said fluoropolymer;
(2) at least one olefin polymer (B) grafted by at least one compound (b), which compound (b) contains at least one functional group (f2) capable of conferring adhesion properties on said olefin polymer and of reacting with the functional group (f1) contained in compound (a);
(3) at least one polymer (C) chosen from polyesters and polyamides.

The fact that a polymer is grafted by a certain compound is customarily understood to mean that one or more molecules of this compound are chemically attached to it, at various locations along the chains of this polymer.

In one particular embodiment of the present invention [embodiment (I)], to which preference is customarily given, one portion of the amount of the functional group (f2) of the compound (b) grafted to the polymer (B) has reacted filth one portion of the amount of the functional group (f1) of the compound (a) grafted to the polymer (A), thus chemically bonding polymer (B) to polymer (A). According to this embodiment, it is preferred that one portion of the amount of the functional group (f1) of the compound (a) and one portion of the amount of the functional group (f2) of the compound (b) remain in the unreacted state, and therefore capable of conferring adhesion properties respectively to the polymer (A) and to the polymer (B). Finally, still according to this particular embodiment, one portion of the amount of the functional group (f1) of the compound (a) grafted to the polymer (A) and/or one portion of the amount of the functional group (f2) of the compound (b) grafted to the polymer (B) may optionally, in addition, have reacted with the polymer (C).

In another embodiment of the present invention [embodiment (II)], the entire amount of the functional group (f1) of the compound (a) grafted to the polymer (A) and the entire amount of the functional group (f2) of the compound (b) grafted to the polymer (B) are in the unreacted state. The polymer compositions according to the latter embodiment of the present invention are advantageously used as precursor compositions to the preparation of the compositions according to embodiment (I) as explained in detail above.

The polymer compositions according to the invention comprise at least one fluoropolymer (A). The term "fluoropolymer" is understood to mean a polymer for which more than 50% by weight of the monomer units are derived from at least one fluoromonomer. The fluoropolymer may be a homopolymer; it may also be a copolymer formed by several fluoromonomers with one another, or else a copolymer formed by one or more fluoromonomers with one or more non-fluorinated monomers. These copolymers may, in particular, be random copolymers, block copolymers or graft copolymers.

The term "fluoromonomer" is understood to mean any monomer that comprises at least one fluorine atom; it customarily comprises at least one ethylenic unsaturation. As examples of fluoromonomers, mention may be made of fluorinated vinyl monomers, fluorinated styrene monomers such as 4-fluorostyrene, fluorinated (meth)acrylic monomers such as trifluoroethyl acrylate and fluorinated conjugated dienes such as 2-fluorobutadiene. The fluoromonomer is preferably a fluorinated vinyl monomer. The expression "fluorinated vinyl monomer" is understood to denote the monoethylenically-unsaturated fluorinated monomers that are aliphatic and that have one or more fluorine atoms and optionally, in addition, one or more chlorine atoms, as the only heteroatom(s). As examples of fluorinated vinyl monomers, mention may be made of vinyl monomers that are free of hydrogen atoms such as tetrafluoroethylene, hexafluoropropylene and chlorotrifluoroethylene, and partially hydrogenated fluorinated vinyl monomers such as vinyl fluoride, trifluoroethylene, 3,3,3-trifluoropropene and, with most particular mention, vinylidene fluoride.

The expression "non-fluorinated monomer" is understood to mean any monomer that is free of fluorine atoms; it customarily comprises at least one ethylenic unsaturation. Examples of non-fluorinated monomers are: α-monoolefins such as, for example, ethylene and propylene; styrene and non-fluorinated styrene derivatives; non-fluorinated chloromonomers such as, for example, vinyl chloride and vinylidene chloride; non-fluorinated vinyl ethers; non-fluorinated vinyl esters such as, for example, vinyl acetate; (meth) acrylic esters, nitriles and amides such as acrylonitrile and acrylamide.

As examples of fluoropolymers, mention may especially be made of the homopolymers of vinylidene fluoride, vinyl fluoride, trifluoroethylene or chlorotrifluoroethylene, and the copolymers that these fluoromonomers form with one another or with at least one other fluoromonomer as defined above (including a fluoromonomer that does not contain hydrogen atoms, such as tetrafluoroethylene or hexafluoropropylene). As examples of such copolymers and terpolymers, mention may be made of the copolymers and terpolymers of vinylidene fluoride and the copolymers and terpolymers of chlorotrifluoroethylene with at least one other fluoromonomer as defined above (including a fluoromonomer that does not contain hydrogen atoms, such as tetrafluoroethylene or hexafluoropropylene). Mention may also be made of the copolymers and terpolymers of at least one of the fluoromonomers mentioned above with at least one non-fluorinated monomer.

The fluoropolymer (A) present in the compositions according to the invention is preferably chosen from vinylidene fluoride polymers.

For the purposes of the present invention, a vinylidene fluoride polymer is a fluoropolymer (i.e. a polymer for which more than 50% by weight of the monomer units are derived from at least one fluoromonomer), comprising monomer units derived from vinylidene fluoride.

As examples of vinylidene fluoride polymers, mention may especially be made of homopolymers of vinylidene fluoride, and copolymers thereof with other ethylenically unsaturated monomers, whether they are fluorinated (examples of other ethylenically unsaturated fluoromonomers are vinyl fluoride, trifluoroethylene, tetrafluoroethylene, chlorotrifluoroethylene and hexafluoropropylene) or non-fluorinated (examples of ethylenically unsaturated non-fluorinated monomers are α-monoolefins such as ethylene and propylene; styrene and non-fluorinated styrene derivatives; non-fluorinated chloromonomers such as vinyl chloride and vinylidene chloride; non-fluorinated vinyl ethers; non-fluorinated vinyl esters such as vinyl acetate; non-fluorinated (meth)acrylic esters, nitrites and amides such as acrylamide and acrylonitrile).

The vinylidene fluoride polymers preferably contain more than 50% by weight of monomer units derived from vinylidene fluoride.

Particularly preferred vinylidene fluoride polymers are vinylidene fluoride homopolymers and random copolymers of vinylidene fluoride that contain 10 to 20% by weight of a fluorinated comonomer chosen from hexafluoropropylene and chlorotrifluoroethylene.

According to the invention, the fluoropolymer (A) is functionalized by grafting with at least one compound (a)—defined and described in detail later on—which contains at least one functional group (f1) capable of conferring adhesion properties on said fluoropolymer.

The functional group (f1) may be any group having a reactivity or a polarity such that it enables the fluoropolymer to develop adhesion forces, even with respect to materials that it is not normally possible to adhere to this polymer. The group (f1) is generally chosen from the groups bearing at least one reactive function that does not take part in radical mechanisms. It is usually chosen from:

(f1.1) groups derived from carboxylic acids, also known more simply hereinbelow as "acid groups"; the carboxylic acids from which these groups originate may be monocarboxylic or dicarboxylic acids;

(f1.2) groups derived from carboxylic anhydrides, resulting from the condensation of two carboxylic acid groups in the same molecule, also known more simply hereinbelow as "anhydride groups"; the carboxylic anhydrides that bear these groups may themselves derive from monocarboxylic or dicarboxylic acids;

(f1.3) groups derived from carboxylic esters, also known more simply hereinbelow as "ester groups";

(f1.4) groups derived from carboxylic amides, also known more simply hereinbelow as "amide groups";

(f1.5) epoxy groups, derived from compounds containing a cyclic ether function;

(f1.6) hydroxylated groups derived from alcohols, also known more simply hereinbelow as "alcohol groups"; the alcohols from which these groups originate may be monoalcohols or polyols;

(f1.7) carbonyl groups;

(f1.8) hydrolysable groups containing a silyl group.

Among all these groups, the epoxy groups (f1.5), the alcohol groups (f1.6) and the carbonyl groups (f1.7) are preferred. More particularly, the epoxy groups and the alcohol groups derived from diols are preferred. The alcohol groups derived from diols give the best results.

As mentioned, the functionalization of the fluoropolymer (A) is carried out by grafting, to this polymer, at least one compound (a) that contains at least one functional group (f1). According to the invention, the functional group(s) (f1) borne by the compound(s) (a) may belong to the same family or to different families. Thus, it is in no way excluded to use both one compound (a) containing an epoxy group and another compound (a) containing one or more alcohol groups; similarly, it is in no way excluded to use a compound (a) containing both an ester group and another group, for example an epoxy or alcohol group.

In order to be able to be grafted to the fluoropolymer (A), the compound (a) must also contain at least one group (g) that makes the grafting of said compound (a) to this polymer possible. This group (g) is generally chosen from:

saturated or unsaturated hydrocarbon-based groups, capable of participating in radical mechanisms, such as additions or associations of radicals;

amino or phenol groups capable of participating in reactions of nucleophilic character;

groups capable of easily forming free radicals such as peroxy and azo groups.

Preferably, the group (g) is chosen from organic groups having at least one ethylenically unsaturated carbon-carbon bond, from amino groups and from peroxy groups. Organic groups having at least one terminal ($\alpha,\beta$) ethylenically unsaturated carbon-carbon bond, such as vinyl, allyl, acryloyloxyalkyl and methacryloyloxyalkyl groups for example, are particularly preferred as the group (g). Allyl groups give the best results.

Examples of compounds (a) that contain at least one organic group having at least one terminal ($\alpha,\beta$) ethylenically unsaturated carbon-carbon bond as group (g) and at least one acid or anhydride group as group (f1) are unsaturated monocarboxylic or dicarboxylic acids such as acrylic acid, methacrylic acid, maleic acid, fumaric acid, itaconic acid, crotonic acid, citraconic acid, bicyclo[2.2.1]hept-2-ene-5,6-dicarboxylic acid, maleic anhydride, itaconic anhydride, crotonic anhydride and citraconic anhydride. Maleic anhydride is generally preferred, in particular for reasons of accessibility.

Examples of compounds (a) that contain at least one organic group having at least one terminal ($\alpha,\beta$) ethylenically unsaturated carbon-carbon bond as groups (g) and at least one ester group as group (f1) are vinyl acetate, vinyl propionate, monomethyl maleate, dimethyl maleate, methyl acrylate, ethyl acrylate, n-propyl acrylate, n-butyl acrylate, isobutyl acrylate, amyl acrylate, hexyl acrylate, 2-ethylhexyl acrylate, methyl methacrylate, ethyl methacrylate, n-propyl methacrylate, n-butyl methacrylate, amyl methacrylate, hexyl methacrylate, 2-ethylhexyl methacrylate, diethyl fumarate, dimethyl itaconate and diethyl citraconate.

Examples of compounds (a) that contain at least one organic group having at least one terminal ($\alpha,\beta$) ethylenically unsaturated carbon-carbon bond as group (g) and at least one amide group as group (f1) are acrylamide and methacrylamide.

An example of compound (a) that contains at least one organic group having at least one terminal ($\alpha,\beta$) ethylenically unsaturated carbon-carbon bond as group (g) and at least one epoxy group as group (f1) is allyl glycidyl ether.

Examples of compounds (a) that contain at least one organic group having at least one terminal ($\alpha,\beta$) ethylenically unsaturated carbon-carbon bond as group (g) and at least one alcohol group as group (f1) are allyl alcohol and 3-allyloxy-1,2-propanediol.

Examples of compounds (a) that contain at least one organic group having at least one terminal ($\alpha,\beta$) ethylenically unsaturated carbon-carbon bond as group (g) and at least one carbonyl group as group (f1) are organic heterocyclic compounds containing a vinyl or allyl group attached to the heteroatom and the heterocycle of which bears the carbonyl bond, such as N-vinylpyrrolidone and N-vinylcaprolactam.

Examples of compounds (a) that contain at least one organic group having at least one terminal ($\alpha,\beta$) ethylenically unsaturated carbon-carbon bond as group (g) and at least one hydrolysable group containing a silyl group as group (f1) are vinyltrimethoxysilane, vinyltriethoxysilane, vinyltriacetoxysilane, vinyltris($\beta$-methoxyethoxy)silane and $\gamma$-methacryloxypropyltrimethoxysilane.

Examples of compounds (a) that contain at least one organic group having at least one terminal ($\alpha,\beta$) ethylenically unsaturated carbon-carbon bond as group (g) and at least two functional groups (f1) of different nature, are: glycidyl acrylate and methacrylate (an ester group and an epoxy group as groups (f1)); hydroxyethyl acrylate and methacrylate and hydroxypropyl acrylate and methacrylate (an ester group and an alcohol group as groups (f1)); N-methylolmethacrylamide (an alcohol group and an amide groups as groups (f1)).

Among all the compounds (a), the compounds containing at least one functional group (f1) chosen from epoxy groups, alcohol groups and carbonyl groups, more particularly from alcohol groups derived from diols, are preferred. Allyl glycidyl ether, 3-allyloxy-1,2-propanediol, N-vinylpyrrolidone and N-vinylcaprolactam give good results. The best results were obtained with 3-allyloxy-1,2-propanediol.

The grafting of the compound (a) to the fluoropolymer (A) may be carried out by any method known for this purpose. Depending on the chemical properties and the physical state of the compound (a), this grafting may be carried out in the solid state, in solution, in suspension, in an aqueous medium or within an organic solvent. This grafting may also be carried out by irradiation, for example by means of an electron beam or by gamma radiation.

The grafting of the compound (a) to the fluoropolymer (A) is most generally carried out on a molten blend of the compound and polymer. It is possible to operate in batch mode, in kneaders, or continuously, in extruders.

The reaction of grafting the compound (a) to the fluoropolymer (A) is usually promoted and initiated by a radical generator, at least when the group (g) of the compound (a) is not itself a group capable of easily forming free radicals, such as peroxy and azo groups. As a radical generator, use is generally made of compounds having a decomposition temperature between 120 and 350° C. and a half life, in this temperature zone, of around one minute. The radical generator is preferably an organic peroxide, and more particularly an alkyl or aryl peroxide. Among these, mention may be made of benzoyl peroxide, dichlorobenzoyl peroxide, dicumyl peroxide, di(t-butyl) peroxide, t-butylcumyl peroxide, 1,3-di(2-t-butylperoxyisopropyl)benzene, 2,5-dimethyl-2,5-di(t-butylperoxy)hexane and 2,5-dimethyl-2,5-di(t-butylperoxy)-3-hexyne. 2,5-Dimethyl-2,5-di(t-butylperoxy)hexane and dicumyl peroxide are particularly preferred.

When the grafting of the compound (a) to the fluoropolymer (A) is carried out continuously in an extruder, the radical generator and the compound (a) may be introduced in any manner so long as they are introduced continuously over time and they are well dispersed in the molten material. The radical generator and the compound (a) may be introduced by spraying, for example by means of a spray-type injector or an atomizer or by injection into the molten mass. The introduction of the radical generator and the compound (a) via a masterbatch with the powdered fluoropolymer (A) or via a masterbatch with a filler can also be envisaged.

According to one particularly preferred embodiment, the compound (a) is introduced before the radical generator.

The expression "reaction in molten mass" is understood to mean, for the purposes of the present invention, any reaction in the substantial absence of solvent or of diluent and at a temperature at least equal to the melting point of the fluoropolymer (A).

The term "extruder" is understood to mean any continuous device comprising at least one feed zone and, at its outlet, a discharge zone preceded by a compression zone, the latter forcing the molten mass to pass through the discharge zone. The discharge zone may additionally be followed by a granulating device or by a device that gives the extruded material its final shape. Advantageously, use is made of known extruders based on the work of a single screw or of two screws which, in the latter case, may cooperate in a co-rotating or counter-rotating manner (same direction of rotation or opposite directions of rotation).

Preferably, the extruder used according to the present invention is arranged so that it successively comprises one feed zone, one material melting zone, one homogenization zone, one reaction zone, optionally one zone for introducing additives, and one compression-discharge zone preceded by one degassing zone. Each of these zones has a very specific function and is at a very specific temperature.

The feed zone has the role of carrying out the feeding of the fluoropolymer (A). It is customarily at a temperature less than or equal to 50° C.

The material melting zone has the role of carrying out the melting of the material.

The homogenization zone has the role of homogenizing the molten material.

The reaction zone has the role of carrying out the reaction.

The temperature in the melting zone and in the zone for homogenization of the material is customarily greater than or equal to the melting point of the fluoropolymer (A).

The temperature in the reaction zone is customarily greater than or equal to the temperature at which the half life of the radical generator is less than the residence time of the material in this zone.

The zone for introducing additives has the role of carrying out the introduction of additives when the latter are added into the extruder. The temperature of this zone is generally a function of the viscosity of the material and the nature of the additives added.

The compression-discharge zone has the role of compressing the material and of carrying out the discharge of the latter. The temperature in the compression-discharge zone is generally a function of the viscosity of the material to be discharged.

The compound (a) is preferably introduced into the extruder before the homogenization zone.

The radical generator is preferably introduced into the reaction zone of the extruder.

Whichever grafting method is used, the amount of compound (a) grafted to the polymer (A), expressed as amount of compound (a), is advantageously greater than 0.01% by weight, preferably 0.05% by weight or, better still, 0.1% by weight, relative to the weight of polymer (A). Moreover, this amount is advantageously less than or equal to 5.0% by weight, preferably 3.0% and better still 2.0% by weight. The metering is customarily carried out by a chemical route (titration).

Quite remarkable adhesive properties and an exceptionally high thermal stability were observed when the polymer (A) being incorporated into the polymer compositions according to the invention was a fluoropolymer grafted by at least one compound (a) containing, as group (g), at least one organic group having at least one ethylenically unsaturated carbon-carbon bond and, as groups (f1), at least two alcohol groups. According to the Applicant, such grafted fluoropolymers are novel products that, therefore, constitute another subject of the present invention; they are referred to hereinbelow as "grafted fluoropolymers according to the present invention".

The grafted fluoropolymers according to the present invention are preferably vinylidene fluoride polymers. Particularly preferably, they contain more than 50% by weight of monomer units derived from vinylidene fluoride. Most particularly preferably, they are chosen from vinylidene fluoride homopolymers and random copolymers of vinylidene fluoride that contain 10 to 20% by weight of a fluorinated comonomer chosen from hexafluoropropylene and chlorotrifluoroethylene.

The group (g) of the compound (a) of the grafted fluoropolymers according to the present invention is preferably an organic group containing at least one terminal ($\alpha,\beta$) ethylenically unsaturated carbon-carbon bond. Particularly preferably, it is chosen from vinyl, allyl, acryloyloxyalkyl and methacryloyloxyalkyl groups. Most particularly preferably, it is an allyl group.

The compound (a) of the grafted fluoropolymers according to the present invention preferably contains at most four alcohol groups. Particularly preferably, it contains at most three thereof. Most particularly preferably, it contains two and two alone thereof.

The compound (a) of the grafted fluoropolymers according to the present invention is preferably chosen from aliphatic and cycloaliphatic compounds. Particularly preferably, it is chosen from aliphatic compounds.

The compound (a) of the grafted fluoropolymers according to the present invention preferably contains at most three ethylenically unsaturated carbon-carbon bonds. Particularly preferably, it contains at most two thereof. Most particularly preferably, it contains one and one alone thereof.

Good results have been obtained when the compound (a) of the grafted fluoropolymers according to the present invention was an alkenediol, in particular when the grafted fluoropolymers in question were chosen from vinylidene fluoride homopolymers and random copolymers of vinylidene fluoride that contain 10 to 20% by weight of a fluorinated comonomer chosen from hexafluoropropylene and chlorotrifluoroethylene.

Excellent results have been obtained when the compound (a) of the fluoropolymers according to the present invention was 3-allyloxy-1,2-propanediol, in particular when the grafted fluoropolymers in question were chosen from vinylidene fluoride homopolymers and random copolymers of vinylidene fluoride that contain 10 to 20% by weight of a fluorinated comonomer chosen from hexafluoropropylene and chlorotrifluoroethylene.

The polymer compositions according to the invention comprise at least one olefin polymer (B). For the purposes of the present invention, the expression "olefin polymer" is understood to mean a polymer for which more than 50% by weight of the monomer units are derived from at least one linear olefin.

Preferably more than 60% by weight, and particularly preferably more than 80% by weight of the monomer units of the olefin polymer (B) are derived from at least one linear olefin.

As examples of linear olefins, mention may be made of linear $\alpha$-monoolefins containing 2 to 20, preferably 2 to 12, carbon atoms, such as ethylene, propylene, 1-butene, 1-pentene, 1-hexene, 1-heptene, 1-octene, 1-nonene, 1-decene, 1-undecene and 1-dodecene. Preferred linear $\alpha$-monoolefins are ethylene and propylene.

The olefin polymer (B) may be chosen, in particular, from homopolymers of the aforementioned olefins and, preferably, from copolymers of these olefins, in particular copolymers of ethylene and propylene, with one another or with one or more comonomers. The olefin polymer (B) may also be chosen from blends of homopolymers of the aforementioned olefins with one another, from blends of copolymers of these olefins with one another and from blends of said homopolymers with said copolymers.

The comonomers may, in particular, be chosen:
from the linear $\alpha$-monoolefins described above;

from branched α-monoolefins containing 4 to 12 carbon atoms such as 3-methylbutene, 4-methylpentene and 5-methylhexene;

from aryl vinyl monomers such as styrene, α-methylstyrene and ortho-methoxystyrene;

from vinyl esters such as vinyl acetate;

from halogenated vinyl and vinylidene monomers such as vinyl chloride and vinylidene chloride;

from vinyl alkyl ethers such as vinyl methyl ether and vinyl isobutyl ether;

from acrylic monomers such as acrylic and methacrylic acids, methyl acrylate, N,N-dimethylacrylamide and acrylonitrile;

from conjugated dienes such as butadiene, isoprene and 1,3-pentadiene;

from non-conjugated dienes such as 1,4-pentadiene, 7-methyl-1,6-octadiene, 5-ethylidene-2-norbornene and bicyclo[2.2.1]oct-2,5-diene.

The weight content of units formed from comonomers in the olefin polymer (B) is advantageously less than 40% by weight and preferably less than 20% by weight.

As has been stated above, the expression "olefin polymer (B)" is understood to mean both the homopolymers and copolymers described above, taken separately, and the blends (i) of these homopolymers with one another, the blends (ii) of the copolymers of these olefins with one another and the blends (iii) of said homopolymers with said copolymers.

It may be advantageous, for the adhesive properties of the compositions according to the invention, for the olefin polymer (B) to be an olefin elastomer, i.e. for it to be a polyolefin having elastomeric characteristics. An olefin elastomer generally fulfils various physical properties defined in the ASTM D 1566 standard.

Preferably, the olefin polymer (B) has a glass transition temperature below −40° C.

It customarily also has one or more other characteristics below, as summarized in document U.S. Pat. No. 5,001,205, the content of which is incorporated here by reference:

a Mooney viscosity (ASTM D 1646 standard) preferably not less than 10;

a weight-average molecular weight ($M_w$) preferably not less than a certain value, 10 000 in the case in question here;

a degree of crystallinity that preferably does not exceed 25%.

When the olefin polymer (B) is a copolymer, it is preferably chosen from copolymers of at least one first linear α-monoolefin chosen from ethylene and propylene, and at least one second α-monoolefin different from the first, chosen from linear α-monoolefins containing 2 to 12 carbon atoms, such as ethylene, propylene, 1-butene, 1-pentene, 1-hexene, 1-heptene and 1-octene and from branched α-monoolefins containing 4 to 12 carbon atoms such as 3-methylbutene, 4-methylpentene and 5-methylhexene. The second α-monoolefin is preferably chosen from ethylene, propylene and octene. Optionally, these copolymers may also contain at least one conjugated diene such as butadiene, isoprene or 1,3-pentadiene or at least one non-conjugated diene such as 1,4-pentadiene, 7-methyl-1,6-octadiene, 5-ethylidene-2-norbornene or bicyclo[2.2.1]oct-2,5-diene.

The respective proportions of first and second α-monoolefins present in the olefin polymer (B) may vary to a large extent. They are preferably chosen so that the olefin polymer (B) exhibits elastomeric characteristics. Thus, the olefin polymer (B) in general comprises at least 40% by weight, preferably at least 75% by weight of the first α-monoolefin, and at least 5% by weight, preferably at least 10% by weight of the second α-monoolefin, relative to the total weight of the olefin polymer (B). The amount of the first α-monoolefin present in the olefin polymer (B) is not generally greater than 95% by weight, preferably not greater than 85% by weight and the amount of the second α-monoolefin present in the olefin polymer (B) is not generally greater than 40%, preferably not greater than 20% by weight, relative to the total weight of the olefin polymer (B). When the olefin polymer (B) contains a conjugated or non-conjugated diene, this diene is present in an amount of at least 0.5%, preferably at least 5% by weight, relative to the total weight of the olefin polymer (B). The amount of conjugated or non-conjugated diene present in the olefin polymer (B) is not generally greater than 25%, preferably not greater than 15%, by weight, relative to the total weight of the olefin polymer (B).

Olefin elastomers that are particularly preferred for being incorporated, as olefin polymer (B), into the compositions according to the invention—in particular when the latter are intended for producing multilayer structures, of which one of the layers to be adhered is a layer of thermoplastic polymer rich in monomer units derived from propylene—are olefin elastomers containing 70 to 95%, preferably 75 to 90%, by weight of propylene, and 5 to 30%, preferably 10 to 25%, by weight of ethylene. Olefin elastomers that correspond in a general manner to this composition may be advantageously prepared in the presence of catalyst systems containing metallocene-based complexes, for example according to the processes described in documents US-B-654088 and US-A-5001205, the content of which is incorporated by reference in the present description.

As a corollary, when the compositions according to the invention are intended for producing multilayer structures, of which one of the layers to be adhered is a layer of thermoplastic polymer rich in monomer units derived from ethylene, olefin elastomers that are particularly preferred for being incorporated, as olefin polymer (B), into the compositions according to the invention, are olefin elastomers containing 70 to 95%, preferably 75 to 90%, by weight of ethylene, and 5 to 30%, preferably 10 to 25%, by weight of a monomer chosen from propylene and octene. The latter may also be advantageously prepared in the presence of the aforementioned catalyst systems.

According to one advantageous embodiment variant of the polymer compositions according to the invention, the olefin polymer (B) may be composed of a blend of an olefin elastomer such as described above with a semicrystalline, non-elastomeric olefin polymer, chosen from homopolymers of the aforementioned olefins and from copolymers of these olefins. As homopolymers and copolymers of the aforementioned olefins for the implementation of this variant, mention may be made of:

homopolymers of ethylene;

homopolymers of propylene;

copolymers of ethylene and of a second linear α-monoolefin containing 3 to 8 carbon atoms, such as propylene, 1-butene and 1-octene;

copolymers of propylene and of another linear α-monoolefin containing 2 to 8 carbon atoms, such as ethylene and 1-butene.

In the case of said copolymers, the content of the second linear α-monoolefin is generally less than 10% by weight, preferably less than 8% by weight, most particularly less than 6% by weight, relative to the weight of copolymer, so as to ensure the semicrystalline nature of the latter.

For the implementation of this variant, it is generally preferred to blend together an olefin elastomer with a non-elastomeric olefin polymer, the constituent olefins of which, present in preponderant amounts, are of the same nature. Furthermore, according to this embodiment variant, the blend thus formed generally contains at least 5% by weight, preferably at least 10% by weight and most particularly at least 15% of non-elastomeric olefin polymer. Generally, the blend thus formed contains at most 40% by weight, preferably at most 30% by weight and most particularly at most 25% of non-elastomeric olefin polymer.

According to the invention, the olefin polymer (B) is grafted by at least one compound (b) containing at least one functional group (f2).

On condition that the functional group (f2) is capable of reacting with the group (f1) contained in the compound (a) and also capable of conferring adhesion properties on the olefin polymer (B), the group (f2) and the compound (b) containing it generally correspond to the same definitions and limitations as those that are applied respectively to the group (f1) and to the compound (a), mentioned above. In other words, everything that has been stated and described above with respect to:

the nature of the functional group (f1);
the nature of the compound (a) containing this functional group (f1);
the nature of the group (g) that makes the grafting of said compound (a) to the fluoropolymer (A) possible;
the processes according to which the compound (a) is grafted to the fluoropolymer (A) and preferred embodiments thereof;

can be applied, mutatis mutandis, to the grafting, to the olefin polymer (B), of the compound (b) containing the functional group (f2).

That being said, it should be noted that the group (f2), for the functionalization, via grafting, of the olefin polymer (B), is preferably chosen from:

(f2.1) groups derived from carboxylic acids ("acid groups");
(f2.2) groups derived from carboxylic anhydrides, resulting from the condensation of two carboxylic acid groups in the same molecule ("anhydride groups").

As regards the compound (b) containing the group (f2), it is preferably chosen from compounds containing at least one organic group having at least one terminal ($\alpha,\beta$) ethylenically unsaturated carbon-carbon bond as the group that makes the grafting of said compound (b) to the olefin polymer (B) possible. Examples of such compounds are unsaturated monocarboxylic or dicarboxylic acids and derivatives thereof and anhydrides of unsaturated monocarboxylic or dicarboxylic acids, such as acrylic acid, methacrylic acid, maleic acid, fumaric acid, itaconic acid, crotonic acid, citraconic acid, bicyclo[2.2.1]hept-2-ene-5,6-dicarboxylic acid, maleic anhydride, itaconic anhydride, crotonic anhydride and citraconic anhydride. Maleic anhydride is particularly preferred, especially for reasons of accessibility.

According to one variant (V1) of the invention, the acid group and/or the anhydride group that are possibly present in the compound (b) are not neutralized.

According to another variant (V2) of the invention, the acid group and/or the anhydride group that are possibly present in the compound (b) are neutralized, completely or partly, by at least one neutralizing agent. This neutralizing agent may be an inorganic salt, an organic salt, or else a mixture of an organic salt and an inorganic salt.

According to (V2), the inorganic salt is preferably a carbonate, a bicarbonate, a phosphate or a monohydrogenphosphate of an alkali metal. Sodium carbonate is particularly preferred.

According to (V2), the organic salt is preferably a carboxylate or a monohydroxycarboxylate or polyhydroxycarboxylate of a metal, which may especially be an alkali metal, an alkaline-earth metal, a metal from group IIIa of the Periodic Table of the Elements or a transition metal. Particularly preferably, the organic salt is a carboxylate of a transition metal or a monohydroxycarboxylate or polyhydroxycarboxylate of an alkali metal. Most particularly preferably, the organic salt is chosen from sodium lactate and zinc acetate.

According to (V2), the neutralizing agent is used in an amount preferably greater than 0.5 molar equivalents relative to the number of moles of the acid and/or anhydride group (f2) that may be present in the compound (b). Furthermore, according to (V2), the neutralizing agent is used in an amount preferably less than 3 mol. eq. relative to the number of moles of the acid and/or anhydride group (f2) that may be present in the compound (b).

The grafting of the compound (b) to the olefin polymer (B) is most generally carried out on a molten blend of the compound and polymer. In the case where the olefin polymer (B) is composed of one of the blends (i), (ii) or (iii) defined above and, in particular, of a blend of an olefin elastomer with a semicrystalline, non-elastomeric olefin polymer, each of the constituents of the blend may be grafted separately by one or more compounds (b), which are identical or different. Preferably, the grafting of the compound(s) (b) may be carried out on said preconstituted blend. It is possible to operate in batch mode, in kneaders, or continuously, in extruders. As regards the operating characteristics of this grafting method, reference is made to the preceding description of the grafting of compound (a) to the fluoropolymer (A).

Whichever grafting method is used, the amount of compound (b) grafted to the polymer (B), expressed as amount of compound (b), is advantageously greater than 0.01% by weight, preferably 0.02% by weight or, better still, 0.03% by weight, relative to the weight of polymer (B). Moreover, this amount is advantageously less than or equal to 3.0% by weight, preferably 1.5% and better still 1.0% by weight.

The polymer compositions according to the invention comprise at least one polymer (C) chosen from polyesters and polyamides.

The term "polyesters" is understood to mean the polymers for which more than 50% by weight, preferably more than 90% by weight, and particularly preferably all of the repeat units are free of fluorine atoms and comprise at least one ester (—C(═O)—O—) group. The expression "repeat units" should be understood to mean repeat units derived from a single monomer that has reacted according to a ring-opening reaction and/or a single monomer that has reacted according to a self-condensation reaction and/or two different monomers that have reacted with one another according to a condensation reaction.

The polyesters that can be used as polymer (C) may be, in particular, any thermoplastic polyester resulting from the polycondensation in the molten phase, optionally followed by a post-condensation in the solid state, of an aromatic or aliphatic dicarboxylic acid or of the dimethyl ester thereof with an aliphatic diol, or else of an aliphatic hydroxyacid with itself or the lactone form thereof.

Examples of dicarboxylic acids or the dimethyl esters thereof that can be used for preparing these polyesters are terephthalic acid, dimethyl terephthalate, methyl naphthalene dicarboxylate and adipic acid. Examples of aliphatic diols that can be used for preparing these polyesters are ethylene glycol, propane-1,3-diol and butane-1,4-diol. Examples of polyesters are polyalkylene terephthalates, such as polyethylene terephthalate and polybutylene terephthalate, polyethylene naphthalate, polybutylene adipate and copolymers thereof.

Aliphatic polyesters obtained by polycondensation of an aliphatic hydroxyacid are also suitable. Examples of aliphatic hydroxyacids that can be used are L- and D-lactic acids (and the cyclic lactides resulting from the condensation of two molecules of the latter) and glycolic acid.

Aliphatic polyesters obtained by opening of a lactone ring are also suitable. Examples of monomers that contain such a lactone ring are ϵ-caprolactone, pivalolactone, enantholactone and caprylolactone.

The term "polyamides" is understood to mean the polymers for which more than 50% by weight, preferably more than 90% by weight, and particularly preferably all of the repeat units are free of fluorine atoms and comprise at least one amide (—C(=O)—NH—) group.

The polyamides that can be used as polymer (C) may be any melt-extrudable polyamide, the number-average molecular weight of which is preferably greater than 5000. Among these polyamides, mention may be made of the products of the polycondensation of equimolar amounts of at least one saturated dicarboxylic acid containing 4 to 14 carbon atoms with a primary diamine containing 4 to 14 carbon atoms. Examples of dicarboxylic acids that can be used for preparing these polyamides are adipic, suberic, sebacic, azelaic, malonic, pimelic, isophthalic and terephthalic acids. Examples of primary diamines that can be used for preparing these polyamides are tetramethylenediamine, pentamethylenediamine, hexamethylenediamine and octamethylenediamine. Examples of polyamides are polyhexamethylene adipamide (nylon 6,6), polyhexamethylene azelamide (nylon 6,9), polyhexamethylene sebacamide (nylon 6,10), polyhexamethylene dodecanoamide (nylon 6,12), polydodecamethylene dodecanoamide) (nylon 12,12) and copolymers thereof. The products of the polycondensation of lactams and amino acids can also be used. Among these products, mention may be made of polycaprolactam (nylon 6), polycaproamide and poly(11-aminoundecanoamide).

The polymer (C) is preferably chosen from aliphatic polyesters and aliphatic polyamides.

The expression "aliphatic polyesters" is understood to mean the polymers for which more than 50% by weight, preferably more than 90% by weight, and particularly preferably all of the repeat units are aliphatic, free of fluorine atoms and comprise at least one ester (—C(=O)—O—) group. These repeat units are customarily the product of the condensation reaction of an aliphatic diacid (and/or of the dimethyl ester thereof) and an aliphatic diol, and/or of the self-condensation reaction of an aliphatic hydroxyacid and/or of the ring-opening reaction of a lactone.

The expression "aliphatic polyamides" is understood to mean the polymers for which more than 50% by weight, preferably more than 90% by weight, and particularly preferably all of the repeat units are aliphatic, free of fluorine atoms and comprise at least one amide (—C(=O)—NH—) group. These repeat units are customarily the product of the condensation reaction of an aliphatic diacid (and/or of the dimethyl ester thereof) and an aliphatic diamine, and/or of the self-condensation reaction of an aliphatic amino acid and/or of the ring-opening reaction of a lactame.

Particularly preferably, the polymer (C) is an aliphatic polyester.

Very particularly preferably, the polymer (C) is an aliphatic polyester for which more than 50% by weight, preferably more than 90% by weight, and particularly preferably all of the repeat units are derived from at least one lactone.

Most preferably, the polymer (C) is a polycaprolactone, i.e. an aliphatic polyester for which more than 50% by weight, preferably more than 90% by weight, and particularly preferably all of the repeat units are derived from ϵ-caprolactone.

The polymer (C) has a number-average molecular weight advantageously of at least 10 000, preferably of at least 50 000, and particularly preferably of at least 70 000. Furthermore, the number-average molecular weight of the polymer (C) is advantageously less than 100 000. The polymer (C) may have a weight-average molecular weight of at least 10 000, of at least 50 000, or of at least 70 000.

The polymer (C) may be ungraded or it may be grafted.

According to one particular embodiment variant of the polymer compositions according to the invention, the polymer (C) is grafted by at least one compound (c) containing at least one functional group (f3), which is preferably capable of conferring adhesion properties on said polymer (C). Furthermore, the functional group (f3) is preferably capable of reacting with the functional group (f1) contained in the compound (a) and/or with the functional group (f2) contained in the compound (b); particularly preferably, the functional group (f3) is capable of reacting with the functional group (f1) contained in the compound (a).

When the functional group (f3) is capable of reacting with the group (f2) contained in the compound (b), the group (f3) and the compound (c) containing it generally correspond to the same definitions and limitations as those that are applied respectively to the group (ft) and to the compound (a), mentioned above. In other words, everything that has been stated and described above with respect to:
- the nature of the functional group (f1);
- the nature of the compound (a) containing this functional group (f1);
- the nature of the group (g) that makes the grafting of said compound (a) to the fluoropolymer (A) possible;
- the processes according to which the compound (a) is grafted to the fluoropolymer (A) and preferred embodiments thereof;

can be applied, mutatis mutandis, to the grafting, to the polymer (C), of the compound (c) containing the functional group (f3).

When the functional group (f3) is capable of reacting with the group (f1) contained in the compound (a), the group (f3) and the compound (c) containing it generally correspond to the same definitions and limitations as those that are applied respectively to the group (f2) and to the compound (b), mentioned above. In other words, everything that has been stated and described above with respect to:
- the nature of the functional group (f2);
- the nature of the compound (b) containing this functional group (f2);
- the nature of the group (g) that makes the grafting of said compound (b) to the olefin polymer (B) possible;
- the processes according to Which the compound (b) is grafted to the olefin polymer (B) and preferred embodiments thereof;

can be applied, mutatis mutandis, to the grafting, to the polymer (C), of the compound (c) containing the functional group (f3).

That being said, it should be noted that the group (f3), for the functionalization, via grafting, of the polymer (C), is preferably chosen from:
  (f3.1) groups derived from carboxylic acids ("acid groups");
  (f3.2) groups derived from carboxylic anhydrides, resulting from the condensation of two carboxylic acid groups in the same molecule ("anhydride groups").

As regards the compound (c) containing the group (f3), it is preferably chosen from compounds containing at least one organic group having at least one terminal (α,β) ethylenically unsaturated carbon-carbon bond as the group that makes the grafting of said compound (c) to the polymer (C) possible. Examples of such compounds are unsaturated monocarboxylic or dicarboxylic acids and derivatives thereof and anhydrides of unsaturated monocarboxylic or dicarboxylic acids, such as arcylic acid, methacrylic acid, maleic acid, fumaric acid, itaconic acid, crotonic acid, citraconic acid, bicyclo[2.2.1]hept-2-ene-5,6-dicarboxylic acid, maleic anhydride, itaconic anhydride, crotonic anhydride and citraconic anhydride. Maleic anhydride is particularly preferred, especially for reasons of accessibility.

The grafting of the compound (c) to the polymer (C) is also most generally carried out on a molten blend of the compound and polymer. It is possible to operate in batch mode, in kneaders, or continuously, in extruders. As regards the operating characteristics of this grafting method, reference is made to the preceding description of the grafting of compound (a) to the fluoropolymer (A).

Whichever grafting method is used, the amount of compound (c) grafted to the polymer (C), expressed as amount of compound (c), is advantageously greater than 0.01% by weight, preferably 0.02% by weight or, better still, 0.03% by weight, relative to the weight of polymer (C). Moreover, this amount is advantageously less than or equal to 3.0% by weight, preferably 1.5% and better still 1.0% by weight.

The respective proportions in which the fluoropolymer (A), in its grafted form, and the olefin polymer (B), in its grafted form, are present in the compositions according to the invention, may vary to a large extent, especially as a function of the respective amounts of compound (a) and of compound (b) grafted respectively to said fluoropolymer and said olefin polymer. In general, these proportions are such that the weight ratio of the fluoropolymer (A) to the olefin polymer (B) [(A)/(B)] is between 10/90 and 90/10. Preferably, the weight ratio [(A)/(B)] is between 35/65 and 65/35. The best results were obtained when the weight of fluoropolymer (A) exceeds the weight of olefin polymer (B) in the composition according to the invention by at least around 25% and by at most around 50%, that is to say when the weight ratio [(A)/(B)] is equal to around 55/45 to around 60/40.

The amount of polymer (C) present in the polymer compositions according to the invention is not generally greater than that of the fluoropolymer (A) and of the olefin polymer (B). In general, the polymer (C) is present in the polymer compositions according to the invention in an amount of 5 to 35% by weight relative to the total weight of the latter compositions, preferably in an amount of 10 to 30% by weight, most particularly in an amount of 18 to 28% by weight.

Most particularly preferably, the polymer compositions according to the invention comprise from 35 to 45% by weight of the fluoropolymer (A), from 30 to 40% by weight of olefin polymer (B) and from 20 to 30% of polymer (C).

The polymer compositions according to the invention may also comprise one or more customary additives for thermoplastic polymers such as, for example, acid scavengers, lubricants, organic or mineral colorants, nucleating agents, fillers, stabilizers and flame retardants.

The polymer compositions according to the invention may be prepared by any known method. Advantageously, a method will be chosen that ensures an intimate mixing of their constituents (A), (B) and (C). Advantageously, a method will be chosen that also allows the at least partial reaction of the functional group (f1) of the compound (a) with the functional group (f2) of the compound (b). Preferably, a method sill be chosen that also allows the at least partial reaction of the functional group (f1) of the compound (a) with the functional group (f2) of the compound (b) and with the optional functional group (f3) of the compound (c).

Another aspect of the invention therefore relates to a method for manufacturing the compositions as described above, according to which the fluoropolymer (A), the olefin polymer (B) and the polymer (C) are mixed as a molten mass. In the method according to the present invention, it is moreover preferred to react the fluoropolymer (A), the olefin polymer (B) and the polymer (C) as a molten mass.

Thus, for example, in the method according to the present invention, the polymers (A), (B) and (C) may first be dry pre-mixed, in the required proportions, in any device suitable for this purpose, such as a drum mixer. The dry premix thus obtained is then melted either in batch mode, in batch devices such as kneaders, or in continuous devices such as the extruders described above with respect to the grafting of the compound (a) to the fluoropolymer (A). The premix intended to be melted can also be produced by the masterbatch technique. It is also possible to feed the kneaders or the extruders with the polymers (A), (B) and (C) metered separately, without dry pre-mixing. It may prove advantageous, in particular when the constituent (B) is an olefin elastomer, to add to the polymers (A), (B) and (C) a few percent by weight, generally between 1 and 20%, preferably between 2 and 10% by weight, of a "processing aid", which may for example be a low-density polyethylene. Furthermore, the use of a polycaprolactone grafted by a compound (c) containing a functional group (f3.2), in particular maleic anhydride, as polymer (C) may also facilitate the manufacture of the polymer compositions according to the invention. Once the polymers (A), (B) and (C) are melted, the mixing of these constituents is carried out or continued in any device suitable for this purpose. Advantageously, to do this use is made of the same batch devices (kneaders, for example) or continuous devices (extruders, for example) as those previously used for the melting operation. Finally, while continuing the melt-blending of the constituents (A), (B) and (C) or after having finished the latter, the constituents (A), (B) and (C) are preferably reacted as a molten mass in these same devices.

A person skilled in the art may easily determine the general operating conditions of the mixing, melting and reaction devices by means of a few prior routine trials. In the case of extruders, in particular, the temperatures of the melting, homogenization and reaction zones are generally controlled between 140 and 270° C., preferably between 170 and 240° C.; the pressure in the die is generally less than 200 bar, preferably 100 bar, and more preferably still 50 bar; the rotational speed of the screw or screws is generally between 50 and 2000 rpm, preferably between 200 and 1000 rpm. It is observed, moreover, that the use, as polymer (B), of a blend of an olefin elastomer with a semicrystalline, non-elastomeric olefin polymer leads, in this case, to well-formed formed granules of uniform dimension.

Good use may be made of the adhesive properties of the compositions according to the invention for producing multilayer structures, which constitute another subject of the present invention. These are multilayer structures for which one of the layers is composed of the polymer composition with adhesive properties. These structures contain at least one other layer which may be composed of various, both inorganic and organic, materials. As inorganic materials that may be incorporated into the composition of this other layer, mention may be made of metals and metal alloys, such as aluminium and steel, for example. As organic materials that may be incorporated into the composition of this other layer, mention may be made of thermoplastic polymers. Examples of thermoplastic polymers that may be incorporated into the composition of this other layer are polymers containing fluorine that belong to the family of fluoropolymers (A) and polymers containing olefins of the same nature as that (those) present in the olefin polymer (B).

Particular multilayer structures according to this aspect of the present invention are three-layer structures having an X/Y/Z configuration, for which the central layer Y is composed of the polymer composition with adhesive properties according to the invention and for which the layers X and Z are composed of a thermoplastic polymer, as defined above. Preferred multilayer structures are three-layer structures having an X/Y/Z configuration, for which the central layer Y is composed of the polymer composition with adhesive properties according to the invention, the layer X is composed of a polymer based on olefin(s) of the same nature as that (those) present in the olefin polymer (B) and the layer Z is composed of a polymer corresponding to the definition of the fluoropolymers (A).

These multilayer structures may be produced according to any process that is known for this purpose and is compatible with the nature of the constituent material of each layer. The assembling of the layers may be carried out, for example, by bonding or by hot press moulding of the constituent layers to one another, by coating of a solid layer with a powder or a solution of the constituent material of the or other layer(s); or else, in particular in the case where the constituent materials of the layers are thermoplastic polymers, by coextrusion, by coextrusion-blow moulding, by coinjection moulding and by coinjection moulding-moulding.

Coextrusion is particularly suitable for the production of three-layer structures having an X/Y/Z configuration, for which the central layer Y is composed of the polymer composition with adhesive properties according to the invention, the layer X is composed of a polymer based on olefin(s) of the same nature as that (those) present in the olefin polymer (B), in particular a homopolymer or copolymer derived from ethylene and/or propylene, and the layer Z is composed of a polymer corresponding to the definition of the fluoropolymers (A), in particular a homopolymer or copolymer derived from vinylidene fluoride. This coextrusion may be carried out, for example, in three extruders, preferably three single-screw extruders, feeding a sheet die via a feed-block or preferably feeding three-layer tubular dies.

The three-layer structures having an X/Y/Z configuration thus produced may be manufactured in the final form of sheets and films.

The three-layer structures having an X/Y/Z configuration thus produced may also be manufactured in the final form of hollow bodies, in particular tanks, bottles, containers, tubes and pipes. The layer X then preferably constitutes the outer (convex) layer of the hollow bodies, whereas the layer Z then constitutes the inner (concave) layer of the hollow bodies. The hollow bodies, in particular the tubes, conduits and tanks, are advantageously used for the transport and/or storage of liquid hydrocarbons, in particular oils and fuels.

The following examples are intended to illustrate the invention without however limiting the scope thereof.

EXAMPLE 1

In a Brabender Plasticorder PL 2000 kneader rotating at 50 rpm, a polymer composition was prepared by mixing together, at a temperature of 200° C.:

(A) a random copolymer containing 85% by weight of vinylidene fluoride and 15% by weight of hexafluoropropylene, for which the melt flow index, $MFI_{2.16kg/230°\ C.}$ (ASTM 1238 standard, 8/2 die) was 8 g/10 min and which was grafted by molecules of 3-allyloxy-1,2-propanediol (this grafted copolymer was obtained by using, in a Clextral model BC 21 co-rotating twin-screw extruder, the feed zone of which was heated at 170° C. and the extrusion die at 220° C., 12 g of 3-allyloxy-1,2-propanediol and 4 g of 2,5-dimethyl-2,5-di(tert-butylperoxy)hexane (DHBP) as radical generator, per kg of extruded copolymer);

(B) an olefin elastomer containing 80% by weight of propylene and 20% by weight of ethylene, for which the melt flow index, $MFI_{2.16kg/230°\ C.}$ (ASTM 1238 standard, 8/2 die) was 2.3 g/10 min, for which the Mooney viscosity (ASTM D 1646 standard) was 25 (product sold by Exxon Mobil Chemical under the name Vistamaxx® VM 1100) and which was grafted, conventionally in an extruder, by maleic anhydride in the presence of DHBP as radical generator;

(C) a polycaprolactone with a number-average molecular weight of 80 000 and for which the melt flow index, $MFI_{2.16kg/160°\ C.}$ (ASTM 1238, 8/2 die) was 3 g/10 min (product sold under the name Capa® 6800 by Solvay).

The constituent (A) represented 45% by weight of the polymer composition, the constituent (B) 30% by weight and the constituent (C) 25% by weight.

In a Werner & Pfleiderer hydraulic press, the mould of which was composed of 180 mm×180 mm×2 mm steel plates coated with a Teflon® non-stick film, a three-layer structure was produced, the central layer of which was composed of the polymer composition prepared as indicated above, the upper layer was composed of a random propylene/ethylene copolymer sold under the name ELTEX® P KS 409 by Ineos (melt flow index, $MFI_{2.16kg/230°\ C.}$ (ASTM 1238 standard, 8/2 die): 5 g/10 min) and the lower layer was composed of the fluoropolymer mentioned in (A) above, but not grafted.

To produce the three-layer structure, the press was held at atmospheric pressure for 10 minutes, then at 50 bar for 2 minutes next, the press was held at 20 bar at ambient temperature for 5 minutes.

A manual peel test showed that it was impossible to detach the constituent layers of the three-layer structure obtained, even with the strongest pulling.

EXAMPLE 2R

This example is given bay way of comparison.

Example 1 was reproduced, except that the polycaprolactone (C) was not used for the preparation of the polymer composition. During the peel test, the lower layer composed of the fluoropolymer was easily detached from the three-layer structure.

EXAMPLE 3R

This example is given by way of comparison.

Example 1 was reproduced, except that the constituents (A) and (B) of the polymer composition were not grafted. During the peel test, the lower layer composed of the fluoropolymer was easily detached from the three-layer structure.

EXAMPLE 4R

This example is given by way of comparison.

Example 1 was reproduced, except that the constituent (B) of the polymer composition was not grafted. During the peel test, the lower layer composed of the fluoropolymer was easily detached from the three-layer structure.

EXAMPLE 5

A polymer composition was prepared as in Example 1, except that the olefin elastomer (B) which was described therein was replaced by an elastomeric ethylene/octene copolymer, for which the melt flow index, $MFI_{2.61kg/190°\ C.}$ (ASTM 1238 standard, 8/2 die) was 6.3 g/10 min and for which the Mooney viscosity (ASTM D 1646 standard) was 8 (product sold by Exxon Mobil Chemical under the name Exact® 5371) grafted, conventionally in an extruder, by maleic anhydride in the presence of DHBP as radical generator.

A three-layer structure was then produced as in Example 1, except that the upper layer was composed of a high-density ethylene homopolymer, of which the density was 0.944 and the melt flow index, $MFI_{2.16kg/190°\ C.}$ (ASTM 1238 standard, 8/2 die) was 3.5 g/10 min (product sold under the name ELTEX® A 4040 by Ineos).

A manual peel test showed that it was impossible to detach the constituent layers of the three-layer structure obtained.

EXAMPLE 6

A polymer composition was prepared as in Example 1, except that the polycaprolactone (C) which was described therein was modified by grafting it, conventionally in an extruder, with maleic anhydride in the presence of DHBP as radical generator. The thus grafted polycaprolactone had a melt flow index, $MFI_{2.16kg/190°\ C.}$ (ASTM 1238 standard, 8/2 die) of 11 g/10 min and a grafted maleic anhydride content of 3.6 g/kg.

To test the adhesivity of this composition, a rod (j1) based on the fluoropolymer mentioned in (A) in Example 1 (not grafted), a rod (j3) of the random propylene/ethylene copolymer mentioned in the same example and a rod (j2) of the polymer composition defined above were manufactured in a capillary rheometer. The rods, cleaned with acetone, were then juxtaposed in pairs (j1) with (j3) then (j2) with (j3)), so as to ensure contact between them, on an aluminium plate on which adjacent grooves, coated with a Teflon® non-stick film, were hollowed out. The aluminium plate was then placed in an oven for 10 minutes at 200° C., then cooled to ambient temperature. A manual peel test showed that it was impossible to detach the rods (j1) and (j3) and difficult to separate the rod (j2) from the rod (j3).

EXAMPLE 7

A polymer composition was prepared as in Example 1, except that the olefin elastomer (B) which was described therein was replaced by a blend that contained 50% by weight of the latter and 50% by weight of a copolymer that contained 96% by weight of propylene and 4% by weight of ethylene, for which the melt flow index, $MFI_{1.2kg/190°\ C.}$ (ASTM 1238 standard, 8/1 die) was 5 g/10 min and which was grafted by 5 g/kg of maleic anhydride (product sold by Solvay under the name Priex® 25095).

A three-layer structure was then produced as in Example 1. A manual peel test carried out on this structure showed that it was very difficult to detach its constituent layers.

EXAMPLE 8

A constituent (A) was prepared as in Example 1, except that the random copolymer containing 85% by weight of vinylidene fluoride and 15% by weight of hexafluoropropylene was grafted by allyl glycidyl ether instead of 3-allyloxy-1,2-propanediol (this grafted copolymer was obtained by using, in a Clextral model BC 21 co-rotating twin-screw extruder, the feed zone of which was heated at 170° C. and the extrusion die at 220° C., 15 g of allyl glycidyl ether and 4 g of 2,5-dimethyl-2,5-di(tert-butylperoxy)hexane (DHBP) as radical generator, per kg of extruded copolymer).

The thermal stability of the constituents (A) from Example 1 (3-allyloxy-1,2-propanediol (AOPD)-grafted PVDF), from Example 3R (ungrafted PVDF) and from the present Example 8 (allyl glycidyl ether (AGE)-grafted PVDF) were compared by thermogravimetric analysis.

The following results were obtained:

| Sample | Temperature at which a weight loss of x % was obtained (° C.) | | | | |
| --- | --- | --- | --- | --- | --- |
| | x = 1% | x = 2% | x = 3% | x = 5% | x = 10% |
| Polymer (A) from Example 3R - ungrafted PVDF | 365° C. | 378° C. | 386° C. | 397° C. | 414° C. |
| Polymer (A) from Example 8 - AGE-grafted PVDF | 369° C. | 387° C. | 394° C. | 403° C. | 418° C. |
| Polymer (A) from Example 1 - AOPD-grafted PVDF | 386° C. | 396° C. | 403° C. | 414° C. | 435° C. |

It was observed that the polymer (A) from Example 1 (AOPD-grafted PVDF) had a much higher thermal stability than that of the polymer (A) from Example 8 (AGE-grafted PVDF), that was itself higher than that of the polymer (A) from Example 3R (ungrafted PVDF).

This excellent thermal stability of the AOPD-grafted PVDF is one of the advantages that makes the use of this polymer in the adhesive polymer compositions according to the present invention particularly attractive.

The invention claimed is:

1. A polymer composition with adhesive properties comprising:
   (1) at least one thermoplastic fluoropolymer (A) grafted by at least one compound (a), wherein said compound (a) contains at least one functional group (f1) capable of conferring adhesion properties on said fluoropolymer;
   (2) at least one olefin polymer (B) grafted by at least one compound (b), wherein said compound (b) contains at least one functional group (f2) capable of conferring adhesion properties on said olefin polymer and of reacting with the functional group (f1) contained in compound (a); and
   (3) at least one polymer (C),
   wherein said polymer (C) is an aliphatic polyester.

2. The polymer composition according to claim 1, wherein said fluoropolymer (A) is a vinylidene fluoride polymer.

3. The polymer composition according to claim 1, wherein said compound (a) contains at least one organic group having at least one terminal ($\alpha,\beta$) ethylenically unsaturated carbon-carbon bond and at least one functional group (f1) chosen from epoxy groups and hydroxylated groups derived from alcohols.

4. The polymer composition according to claim 3, wherein said compound (a) is 3-allyloxy-1,2-propanediol.

5. The polymer composition according to claim 1, wherein said olefin polymer (B) is an olefin elastomer.

6. The polymer composition according to claim 1, wherein said olefin polymer (B) is a blend of an olefin elastomer with a semicrystalline, non-elastomeric olefin polymer.

7. The polymer composition according to claim 1, wherein said compound (b) contains at least one organic group having at least one terminal ($\alpha,\beta$) ethylenically unsaturated carbon-carbon bond and at least one functional group (f2) chosen from groups derived from carboxylic acids and groups derived from carboxylic an hydrides.

8. The polymer composition according to claim 1, wherein said polymer (C) is a polycaprolactone.

9. The polymer composition according to claim 8, wherein said polymer (C) is a polycaprolactone grafted by a compound (c) that contains at least one organic group having at least one terminal ($\alpha,\beta$) ethylenically unsaturated carbon-carbon bond and at least one functional group (f3) derived from a carboxylic anhydride.

10. The polymer composition according to claim 1, wherein the weight ratio of said fluoropolymer (A) to said olefin polymer (B) is between 65/35 and 35/65.

11. The polymer composition according to claim 1, wherein said polymer (C) is present in an amount of 5 to 35% by weight relative to the total weight of the compositions.

12. A method for manufacturing the polymer composition according to claim 1, wherein said fluoropolymer (A), said olefin polymer (B) and said polymer (C) are mixed as a molten mass.

13. The method according to claim 12, wherein said fluoropolymer (A), said olefin polymer (B) and said polymer (C) are also reacted as a molten mass.

14. A multilayer structure comprising a layer composed of a polymer composition according to claim 1, and at least one other layer.

15. The multilayer structure according to claim 14, being a three-layer structure having an X/Y/Z configuration of layers X, Y and Z, wherein the central layer Y is composed of a polymer composition according to claim 1, wherein the layer X is composed of an olefin polymer, and wherein the layer Z is composed of a fluoropolymer.

16. The multilayer structure according to claim 15, being manufactured in a final form of hollow bodies selected from the group consisting of tanks, bottles, containers, tubes, and pipes, the layer X constituting the outer layer of said hollow bodies, and the layer Z constituting the inner layer of said hollow bodies.

17. A method of transporting and/or storing liquid hydrocarbons comprising introducing the liquid hydrocarbons into the multilayer structure according to claim 16.

\* \* \* \* \*